(12) United States Patent
Ichihashi et al.

(10) Patent No.: US 11,165,343 B2
(45) Date of Patent: Nov. 2, 2021

(54) POWER SUPPLY CIRCUIT AND POWER SUPPLY APPARATUS

(71) Applicant: SONY SEMICONDUCTOR SOLUTIONS CORPORATION, Kanagawa (JP)

(72) Inventors: Masahiro Ichihashi, Fukuoka (JP); Kenya Kondou, Fukuoka (JP); Kazumasa Nishimura, Fukuoka (JP); Syou Mitsuishi, Fukuoka (JP); Toshio Suzuki, Fukuoka (JP); Nobuhiko Shigyo, Fukuoka (JP); Masayuki Katakura, Kanagawa (JP); Motoyasu Yano, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 60 days.

(21) Appl. No.: 16/611,922

(22) PCT Filed: May 1, 2018

(86) PCT No.: PCT/JP2018/017467
§ 371 (c)(1),
(2) Date: Nov. 8, 2019

(87) PCT Pub. No.: WO2018/211980
PCT Pub. Date: Nov. 22, 2018

(65) Prior Publication Data
US 2021/0152083 A1    May 20, 2021

(30) Foreign Application Priority Data

May 17, 2017    (JP) .............................. JP2017-097941

(51) Int. Cl.
*H02M 3/07*   (2006.01)
*H02M 3/158*  (2006.01)

(52) U.S. Cl.
CPC ............. *H02M 3/07* (2013.01); *H02M 3/158* (2013.01)

(58) Field of Classification Search
CPC ............................... H02M 3/07; H02M 3/158
See application file for complete search history.

(56) References Cited

U.S. PATENT DOCUMENTS

| 2011/0080198 A1 | 4/2011 | Ohta et al. |
| 2015/0214837 A1 | 7/2015 | Ogawa |
| 2016/0241218 A1 | 8/2016 | Muneyasu et al. |

FOREIGN PATENT DOCUMENTS

| CN | 104811032 A | 7/2015 |
| JP | 06-283667 A | 10/1994 |

(Continued)

OTHER PUBLICATIONS

International Search Report and Written Opinion of PCT Application No. PCT/JP2018/017467, dated May 29, 2018, 11 pages of ISRWO.

*Primary Examiner* — Sibin Chen
(74) *Attorney, Agent, or Firm* — Chip Law Group

(57) ABSTRACT

An object of the present technology is to stably operate a power supply circuit. A charge switch is connected to a first terminal of a capacitor and charges the capacitor with an input voltage on the basis of a control signal inputted to a control terminal. A discharge switch is complementary with the charge switch, is connected to the first terminal of the capacitor, and discharges on the basis of the control signal inputted to the control terminal the voltage charged to the capacitor, thereby generating an output voltage. A charge control signal converting section converts a charge control signal that controls the charge into a control signal refer- (Continued)

enced to the input voltage and inputs the resulting control signal to the control terminal of the charge switch. A discharge control signal converting section converts a discharge control signal that controls the discharge into a control signal referenced to the output voltage and inputs the resulting control signal to the control terminal of the discharge switch. A pulse voltage supplying section supplies a pulse voltage to a second terminal. A control signal generating section exclusively generates the charge control signal and the discharge control signal and supplies the charge control signal and the discharge control signal.

7 Claims, 10 Drawing Sheets

(56) References Cited

FOREIGN PATENT DOCUMENTS

| | | | |
|---|---|---|---|
| JP | 08-149802 A | | 6/1996 |
| JP | 2007-49809 | * | 2/2007 |
| JP | 2007-049809 A | | 2/2007 |
| JP | 2011-083050 A | | 4/2011 |
| JP | 2015-142449 A | | 8/2015 |
| JP | 2015-177320 A | | 10/2015 |
| JP | 2016-149858 A | | 8/2016 |

* cited by examiner

POWER SUPPLY CIRCUIT AND POWER SUPPLY APPARATUS

CROSS REFERENCE TO RELATED APPLICATIONS

This application is a U.S. National Phase of International Patent Application No. PCT/JP2018/017467 filed on May 1, 2018, which claims priority benefit of Japanese Patent Application No. JP 2017-097941 filed in the Japan Patent Office on May 17, 2017. Each of the above-referenced applications is hereby incorporated herein by reference in its entirety.

TECHNICAL FIELD

The present technology relates to a power supply circuit or a power supply apparatus. More particularly, the present technology relates to a power supply circuit or a power supply apparatus which converts a voltage by a charge pump circuit.

BACKGROUND ART

In the past, a power supply circuit having a charge pump circuit has been used. This charge pump circuit is a circuit which performs charge/discharge of an input power supply voltage for a capacitor, thereby obtaining an output of a voltage different from an input voltage. For example, a charge pump circuit having a configuration in which a drain of an N-channel MOS transistor and a drain of a P-channel MOS transistor are connected to one end of a capacitor in common has been used. In this charge pump circuit, the N-channel MOS transistor and the P-channel MOS transistor operate as a charge switch and a discharge switch, respectively. This charge pump circuit is specifically configured as follows. The N-channel MOS transistor and the P-channel MOS transistor described above are connected in series, and a source of the N-channel MOS transistor is connected to an input power supply. On the other hand, a source of the P-channel MOS transistor is connected to an output node. Charge/discharge of a capacitor in this circuit can be performed as follows. First, the other end of the capacitor is grounded, and the N-channel MOS transistor is brought into a conducting state, thereby applying an input power supply voltage to the capacitor to charge the capacitor. Next, a pulse voltage is applied to the other end of the capacitor, and the P-channel MOS transistor is brought into conduction. As a result, since the capacitor is discharged in a state in which the pulse voltage is superimposed, a voltage obtained by adding the pulse voltage to the input voltage is outputted via the P-channel MOS transistor.

Since the N-channel MOS transistor and the P-channel MOS transistor in the charge pump circuit described above are mutually complementary elements and are driven exclusively, a common gate driving signal can be applied to their gate terminals. In other words, the gate terminals can be connected to a common node (hereinafter, referred to as a gate input node). In addition, as described above, the drains of the N-channel MOS transistor and the P-channel MOS transistor and the one end of the capacitor are connected to a common node (hereinafter, referred to as a common drain node). By connecting these gate input node and common drain node crosswise to each other in two charge pump circuits, generation of the gate input signal can be omitted. The reason for this is that the voltage of the common drain node of one of the charge pump circuits can be used as a gate input signal to the other charge pump circuit. In the power supply circuit, by applying the pulse voltage alternately to the two capacitors, charge and discharge can be executed alternately for the two charge pump circuits (e.g., refer to PTL1).

CITATION LIST

Patent Literature

[PTL1]:
Japanese Patent Laid-Open No. 2015-177320

SUMMARY

Technical Problem

In the related art described above, it is necessary to make a difference between the input power supply voltage and the voltage of the output node, and a difference between the output voltage and the voltage of the output node larger than a threshold voltage of a MOS transistor. The reason for this is that the voltages of these differences become the gate input voltages of the N-channel MOS transistor and the P-channel MOS transistor. For this reason, there is a problem that in the case where a voltage of a difference between the input power source voltage and the output voltage is equal to or smaller than the threshold voltage of the MOS transistor, the gate input voltage is insufficient, and therefore, the power supply circuit is unable to operate stably.

The present technology has been made in light of the problem described above, and it is therefore an object of the present technology to stably operate the power supply circuit in the case where the voltage of the difference between the input power supply voltage and the output voltage is low.

Solution to Problem

The present technology has been made in order to solve the problem described above, and a first aspect of the present technology is a power supply circuit, including: a charge pump circuit including a capacitor having first and second terminals and charged with an input voltage, a charge switch connected to the first terminal and charging the capacitor with the input voltage on the basis of a control signal inputted to a control terminal, a discharge switch connected to the first terminal and generating an output voltage by discharging on a basis of a control signal inputted to a control terminal a voltage charged to the capacitor, the discharge switch being complementary with the charge switch, a charge control signal converting section converting a charge control signal that controls the charge into a control signal referenced to the input voltage and inputting the resulting control signal to the control terminal of the charge switch, and a discharge control signal converting section converting a discharge control signal that controls the discharge into a control signal referenced to the output voltage and inputting the resulting control signal to the control terminal of the discharge switch; a pulse voltage supplying section supplying a pulse voltage to the second terminal; and a control signal generating section exclusively generating the charge control signal and the discharge control signal and supplying the charge control signal and the discharge control signal to the charge control signal converting section and the discharge control signal converting section, respectively. As a result, there is brought an operation that the control signals converted by the charge control signal converting section and the discharge control signal converting section are individually supplied to the charge switch and the discharge switch.

In addition, a second aspect of the present technology is a power supply apparatus, including: a charge pump circuit including a capacitor having first and second terminals and charged with an input voltage, a charge switch connected to the first terminal and charging the capacitor with the input voltage on a basis of a control signal inputted to a control terminal, a discharge switch connected to the first terminal and generating an output voltage by discharging on a basis of a control signal inputted to a control terminal a voltage charged to capacitor, the discharge switch being complementary with the charge switch, a charge control signal converting section converting a charge control signal that controls the charge into a control signal referenced to the input voltage and inputting the resulting control signal to the control terminal of the charge switch, and a discharge control signal converting section converting a discharge control signal that controls the discharge into a control signal referenced to the output voltage and inputting the resulting control signal to the control terminal of the discharge switch; a pulse voltage supplying section supplying a pulse voltage to the second terminal; a control signal generating section exclusively generating the charge control signal and the discharge control signal and supplying the charge control signal and the discharge control signal to the charge control signal converting section and the discharge control signal converting section, respectively; and an output voltage control section adjusting the pulse voltage in response to the output voltage to stabilize the output voltage. As a result, there is brought an operation that the control signals converted the charge control signal converting section and the discharge control signal converting section are individually supplied to the charge switch and the discharge switch.

Advantageous Effect of Invention

According to the present technology, an excellent effect is produced such that in the case where the voltage of the difference between the input power supply voltage and the output voltage is low, the power supply circuit is operated stably.

DESCRIPTION OF EMBODIMENTS

Next, a description will be given with respect to modes for carrying out the present technology (hereinafter, referred to as embodiments) with reference to the drawings. In the following drawings, the same or similar constituent elements are denoted by the same or similar reference signs. Note however that the drawings are schematic, and ratios or the like of the sizes of the sections do not necessarily agree with the actual ones. In addition, needless to say, the drawings include parts in which the relation and ratio in terms of the size are different from those of others. In addition, the description on the embodiments is given in the following order.

1. First Embodiment
2. Second Embodiment
3. Third Embodiment
4. Fourth Embodiment 1. First Embodiment

[Configuration of Power Supply Apparatus>

Figure 1:
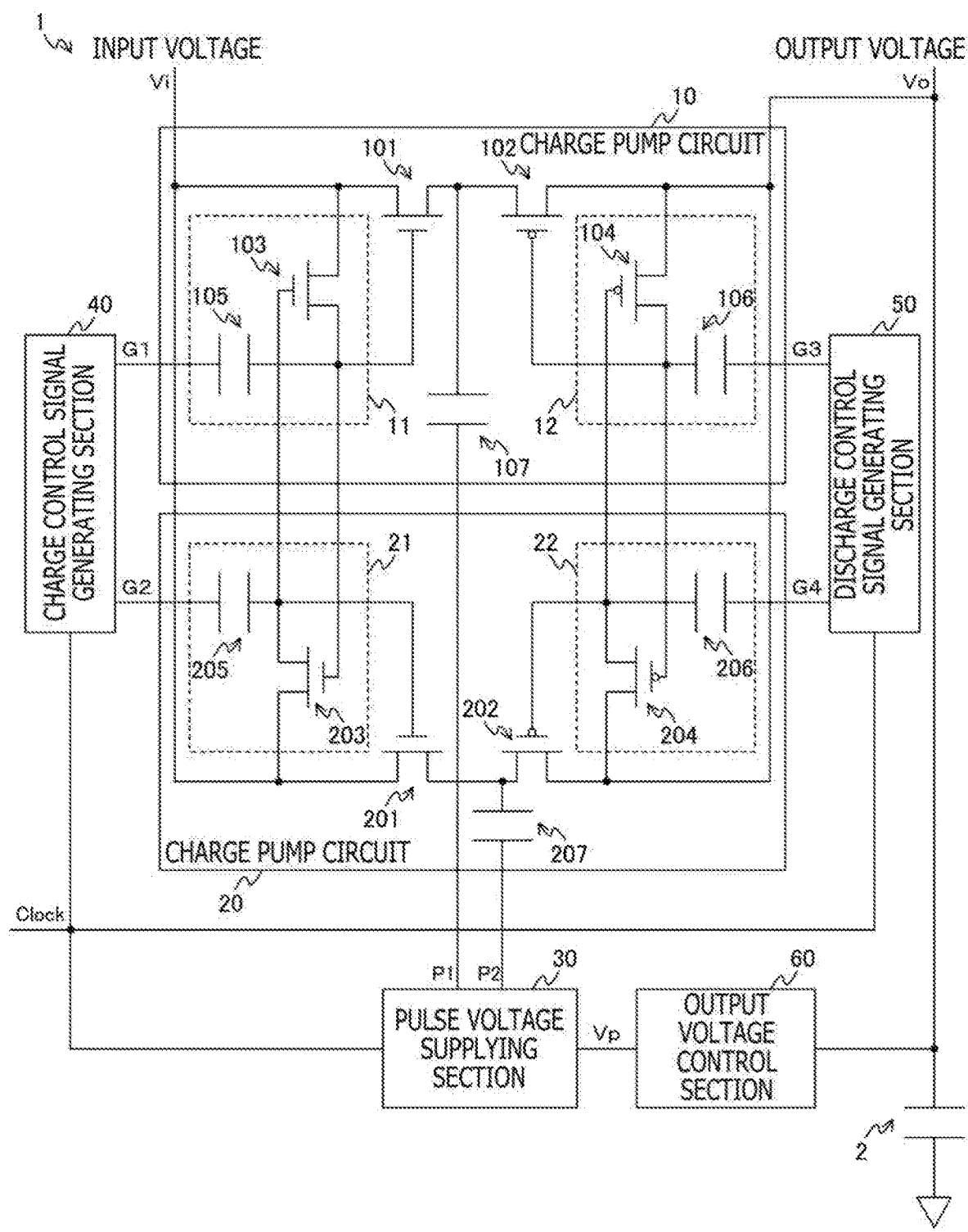
FIG. 1 is a diagram depicting an example of a configuration of a power supply apparatus according to a first embodiment of the present technology.

FIG. 1 is a diagram depicting an example of a configuration of a power supply apparatus according to a first embodiment of the present technology. The power supply apparatus 1 depicted in the figure includes charge pump circuits 10 and 20, a pulse voltage supplying section 30, a charge control signal generating section 40, a discharge control signal generating section 50, an output voltage control section 60, and a capacitor 2. It is to be noted that the charge pump circuits 10 and 20, the pulse voltage supplying section 30, the charge control signal generating section 40, and the discharge control signal generating section 50 constitute a power supply circuit.

In the figure, wiring Vi is wiring to which an input power supply is connected and an input voltage is applied. Wiring Vo is wiring through which a voltage generated by the power supply circuit is outputted. The capacitor 2 is a capacitor which is connected between the wiring Vo and the ground, and stabilizes the output voltage.

The charge pump circuits 10 and 20 are circuits which convert an input power supply voltage by a charge pump to generate an output voltage. In this description, a charge pump means a system in which charge and discharge of the input power supply voltage to the capacitor are performed to obtain output of a voltage different from the input power supply voltage. These charge pump circuits 10 and 20 are configured as circuits which have substantially the same configuration.

The charge pump circuit 10 includes MOS transistors 101 to 104 and capacitors 105 to 107. An N-channel MOS transistor can be used for the MOS transistors 101 and 103. A P-channel MOS transistor can be used for the MOS transistors 102 and 104. As just described, complementary semiconductor elements can be used for the MOS transistors 101 and 102. The MOS transistor 103 and the capacitor 105 constitute a charge control signal converting section 11. The MOS transistor 104 and the capacitor 106 constitute a discharge control signal converting section 12.

The charge pump circuit 20 includes MOS transistors 201 to 204 and capacitors 205 to 207. A N-channel MOS transistor can be used for the MOS transistors 201 and 203. A P-channel MOS transistor can be used for the MOS transistors 202 and 204. As just described, complementary semiconductor elements can also be used for the MOS transistors 201 and 202. The MOS transistor 203 and the capacitor 205 constitute a charge control signal converting section 21. The MOS transistor 204 and the capacitor 206 constitute a discharge control signal converting section 22.

Signal lines G1 and G2 are signal lines through which charge control signals to be described later are transmitted to the charge control signal converting sections 11 and 21, respectively. Signal lines G3 and G4 are signal lines through which discharge control signals to be described later are transmitted to the discharge control signal converting sections 12 and 22, respectively. Signal lines P1 and P2 are signal lines through which pulse voltages to be described later are transmitted, respectively. A signal line Clock is a signal line through which a clock signal is transmitted. This clock signal is a signal which serves as a reference for the operations of the charge control signal generating section 40 and the like.

A source of the MOS transistor 101 and a drain of the MOS transistor 103 are connected to the wiring Vi. Gates of the MOS transistors 101 and 203 and a source of the MOS transistor 103 are connected to one end of the capacitor 105 in common. The other end of the capacitor 105 is connected to the signal line G1. Drains of the MOS transistors 101 and 102 are connected to one end of the capacitor 107 in common. The other end of the capacitor 107 is connected to the signal line P1. A source of the MOS transistor 102 and a drain of the MOS transistor 104 are connected to the wiring Vo in common. Gates of the MOS transistors 102 and 204 and a source of the MOS transistor 104 are connected to one end of the capacitor 106 in common. The other end of the capacitor 106 is connected to the signal line G3.

A source of the MOS transistor 201 and a drain of the MOS transistor 203 are connected to the wiring Vi in common. Gates of the MOS transistors 201 and 103 and a source of the MOS transistor 203 are connected to one end of the capacitor 205 in common. The other end of the capacitor 205 is connected to the signal line G2. Drains of the MOS transistors 201 and 202 are connected to one end of the capacitor 207 in common. The other end of the capacitor 207 is connected to the signal line P2. A source of the MOS transistor 202 and a drain of the MOS transistor 204 are connected to the wiring Vo in common. Gates of the MOS transistors 202 and 104 and a source of the MOS transistor 204 are connected to one end of the capacitor 206 in common. The other end of the capacitor 206 is connected to the signal line G4.

The capacitors 107 and 207 are capacitors charged with an input power supply voltage (an input voltage in the figure). The MOS transistors 101 and 201 are MOS transistors that charge the capacitors 107 and 207, respectively. When a control signal having a voltage equal to or larger than a threshold voltage is inputted to the gate of the MOS transistor 101, the MOS transistor 101 electrically connects the wiring Vi and one end of the capacitor 107 (hereinafter, referred to as a first terminal). At this time, since the other end of the capacitor 107 (hereinafter, referred to as a second terminal) is grounded through the pulse voltage supplying section 30 to be described later, the capacitor 107 is charged with the input power supply voltage. Also in the case of the MOS transistor 201, when the control signal is inputted to the gate of the MOS transistor 201, the MOS transistor 201 electrically connects the wiring Vi and the first terminal of the capacitor 207 to perform charge. It is to be noted that the capacitors 107 and 207 are examples of a capacitor described in the claims. The MOS transistors 101 and 201 are examples of a charge switch described in the claims.

The MOS transistors 102 and 202 are MOS transistors that discharge the capacitors 107 and 207, respectively. When a control signal is inputted to the gate of the MOS transistor 102, the MOS transistor 102 electrically connects the wiring Vo and the first terminal of the capacitor 107. At this time, since a pulse voltage is applied to the second terminal of the capacitor 107 by the pulse voltage supplying section 30, the capacitor 107 is discharged in a state in which the pulse voltage is superimposed. As a result, an output voltage having a value in which the input power supply voltage and the pulse voltage are added is outputted to the wiring Vo to be accumulated in the capacitor 2. The MOS transistor 202 also electrically connects the wiring Vo and the first terminal of the capacitor 207 to discharge the capacitor 207 when a control signal is inputted to the gate. It is to be noted that the MOS transistors 102 and 202 are examples of a discharge switch described in the claims.

The charge control signal converting sections 11 and 21 convert the charge control signals outputted from the charge control signal generating section 40 to be described later into the control signals for the MOS transistors 101 and 201. The sources of the MOS transistors 101 and 201 are connected to the wiring Vi and have the same potential as that of the input power supply voltage. On the other hand, the charge control signal is a signal referenced to the ground potential. Thus, conversion of the reference potential of signals is performed by the charge control signal converting section 11 and the like. This conversion is performed by each of the capacitors 105 and 205. By charging the capacitor 105 and the like with the input power supply voltage, the reference potential is converted and a pulse-shaped control signal is transmitted. In other words, the capacitor 105 and the like operate as a coupling capacitor. In addition, the MOS transistors 103 and 203 charge the capacitors 105 and 205 with the input power supply voltage at the time of the conducting state and short circuit between the gate and the source of the MOS transistor 101 and the like to maintain a non-conducting state of the MOS transistor 101 and the like.

In other words, the gates of the MOS transistors 103 and 203 are connected respectively to the capacitors 205 and 105. Thus, when charge control signals are supplied to the signal lines G1 and G2, the MOS transistors 203 and 103 respectively come into conduction. Specifically, when the charge control signal is supplied to the signal line G1 to bring the MOS transistor 101 into conduction, the MOS transistor 203 of the charge control signal converting section 21 comes into conduction. Similarly, when the charge control signal is supplied to the signal line G2 to bring the MOS transistor 201 into conduction, the MOS transistor 103 of the charge control signal converting section 11 comes into conduction. As a result, when either the MOS transistor 101 or 201 is in a conducting state, short circuit between the gate and the source of the other MOS transistor 101 or 201 is performed, and the non-conducting state of the MOS transistor can be secured.

The discharge control signal converting sections 12 and 22 convert the discharge control signal outputted from the discharge control signal generating section 50 to be described later into the control signals for the MOS transistors 102 and 202. The sources of the MOS transistors 102 and 202 are connected to the wiring Vo and have the same potential as that of the output voltage. Thus, similarly to the case of the charge control signal converting section 11 and the like, conversion of the reference potential for signals is performed by the discharge control signal converting section 12 and the like. Since the operations of the discharge control signal converting section 12 and the like are similar to those of the charge control signal converting section 11 and the like, description is omitted.

The pulse voltage supplying section 30 generates the pulse voltage and supplies the pulse voltage to the second terminals of the capacitors 107 and 207. This pulse voltage supplying section 30 supplies the pulse voltage via the signal lines P1 and P2. In this description, the pulse voltage is a voltage to be superimposed on the charge voltage of the capacitor 107 or the like in order to obtain a desired output voltage. For example, in a case in which an output voltage which is twice as large as the input power supply voltage is required, a pulse voltage having approximately the same value as that of the input power supply voltage can be supplied from the pulse voltage supplying section 30. The pulse voltage is generated at a timing based on the clock signal transmitted through the signal line Clock. In addition, a pulse voltage having a value according to the control voltage outputted from an output voltage control section 60 to be described later is generated. Details of the configuration of the pulse voltage supplying section 30 will be described later.

The charge control signal generating section 40 generates a charge control signal that controls the charge in the MOS transistors 101 and 201 and supplies the charge control signal respectively via the signal lines G1 and G2. In addition, the discharge control signal generating section 50 generates a discharge control signal that controls the discharge in the MOS transistors 102 and 202, and supplies the discharge control signal respectively via the signal lines G3 and G4. These charge control signal generating section 40 and discharge control signal generating section 50 exclusively generate the charge control signal and the discharge control signal on the basis of the clock signal transmitted through the signal line Clock. Details of the configurations of the charge control signal generating section 40 and the discharge control signal generating section 50 will be described later. It is to be noted that the charge control signal generating section 40 and the discharge control signal generating section 50 are examples of a control signal generating section described in the claims.

The output voltage control section 60 adjusts the pulse voltage in response to the output voltage to stabilize the output voltage from the power supply apparatus 1. This output voltage control section 60 adjusts the pulse voltage by, for example, generating a control voltage according to the output voltage, and outputting the generated control voltage to the pulse voltage supplying section 30 via the signal line Vp. Details of the configuration of the output voltage control section 60 will be described later.

[Configuration of Pulse Voltage Supplying Section]

Figure 2:
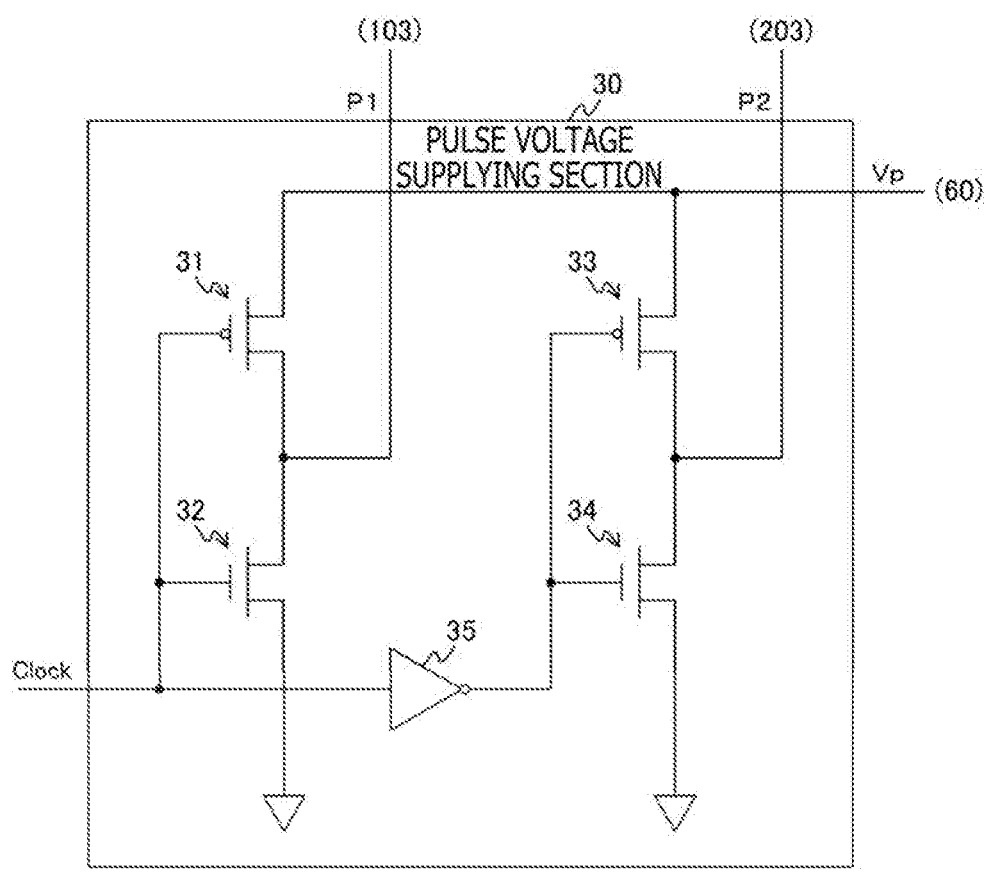
FIG. 2 is a diagram depicting an example of a configuration of a pulse voltage supplying section according to the first embodiment of the present technology.

FIG. 2 is a diagram depicting an example of the configuration of the pulse voltage supplying section according to the first embodiment of the present technology. The pulse voltage supplying section 30 depicted in the figure includes MOS transistors 31 to 34 and an inverting buffer 35. A P-channel MOS transistor can be used for the MOS transistors 31 and 34. An N-channel MOS transistor can be used for the MOS transistors 32 and 34.

Gates of the MOS transistors 31 and 32 and an input of the inverting buffer 35 are connected to the signal line Clock in common. Drains of the MOS transistors 31 and 32 are connected to the signal line P1 in common. Gates of the MOS transistors 33 and 34 are connected to an output of the inverting buffer 35 in common. Sources of the MOS transistors 31 and 33 are connected to the signal line Vp in common, and sources of the MOS transistors 32 and 34 are grounded.

The MOS transistors 31 and 32 and the MOS transistors 33 and 34 each constitute inverters. The MOS transistors 31 and 32 generate a pulse voltage having a waveform obtained by inverting the clock signal, and the MOS transistors 33 and 34 generate a pulse voltage having the same waveform as that of the clock signal. Since a control voltage generated by the output voltage control section 60 is supplied via the signal line Vp to the sources of the MOS transistors 31 and 33, a pulse voltage having approximately the same value as that of the control voltage is generated. As a result, the pulse voltage can be adjusted. The adjusted pulse voltage is supplied via the signal lines P1 and P2.

[Configuration of Charge Control Signal Generating Section]

Figure 3:
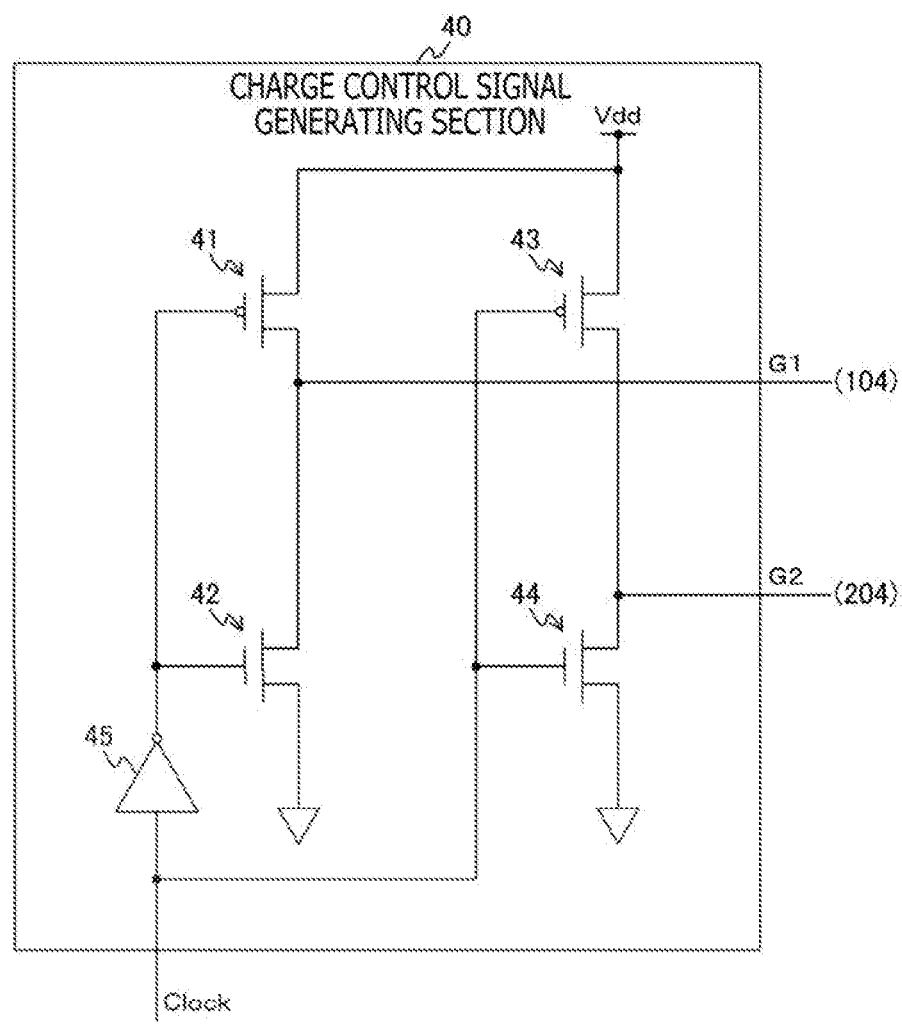
FIG. 3 is a diagram depicting an example of a configuration of a charge control signal generating section according to the first embodiment of the present technology.

FIG. 3 is a diagram depicting an example of a configuration of the charge control signal generating section according to the first embodiment of the present technology. The charge control signal generating section 40 depicted in the figure includes MOS transistors 41 to 44 and an inverting buffer 45. A P-channel MOS transistor can be used for the MOS transistors 41 and 43. An N-channel MOS transistor can be used for the MOS transistors 42 and 44. In addition, power is supplied to the charge control signal generating section 40 depicted in the figure via a power supply line Vdd. This power is, unlike the input power supply illustrated in FIG. 1, power necessary for the operations of the control circuit and the like of the power supply apparatus 1.

Gates of the MOS transistors 43 and 44, and an input of the inverting buffer 45 are connected to the signal line Clock in common. Gates of the MOS transistors 41 and 42 are connected to an output of the inverting buffer 45 in common. Drains of the MOS transistors 41 and 42 are connected to the signal line G1 in common. Drains of the MOS transistors 43 and 44 are connected to the signal line G2 in common. Sources of the MOS transistors 41 and 43 are connected to the power supply line Vdd, and sources of the MOS transistors 42 and 44 are grounded.

The MOS transistors 41 and 42 constituting an inverter generate a charge control signal which is in phase with the clock signal, and the MOS transistors 43 and 44 generate a charge control signal opposite in phase from the clock signal. Since the sources of the MOS transistors 41 and 43 are connected to the power supply line Vdd, a control signal having a voltage substantially equal to the power supply voltage is generated. This power source voltage can, for example, be made to be a voltage higher than the threshold voltage for the MOS transistors 101, 102, 201, and 202 described in FIG. 1. The generated charge control signal is supplied via the signal lines G1 and G2.

It is to be noted that since the configuration of the charge control signal generating section 50 is similar to that of the charge control signal generating section 40 in the figure, description is omitted.

[Configuration of Output Voltage Control Section]

Figure 4:
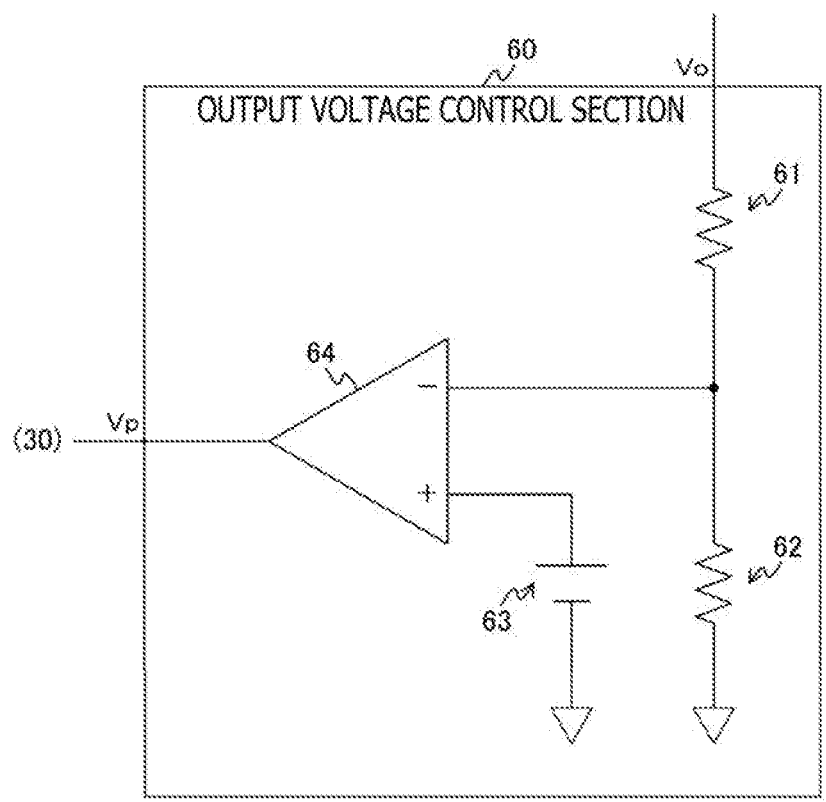
FIG. 4 is a diagram depicting an example of a configuration of an output voltage control section according to an embodiment of the present technology.

FIG. 4 is a diagram depicting an example of a configuration of the output voltage control section according to an embodiment of the present technology. The output voltage control section 60 depicted in the figure includes resistors 61 and 62, a voltage source 63, and an error amplifier 64.

One end of the resistor 61 is connected to the wiring Vo, and the other end of the resistor 61 is connected to an inverting input of the error amplifier 64 and one end of the resistor 62. The other end of the resistor 62 is grounded. The voltage source 63 is connected between a non-inverting input of the error amplifier 64 and the ground.

The resistors 61 and 62 are resistors that divide the output voltage. The divided output voltage is supplied to an inverting input of the error amplifier 64. The voltage source 63 is a voltage source that supplies a reference voltage serving as a reference for the output voltage to the non-inverting input of the error amplifier 64. The error amplifier 64 compares the divided output voltage with the reference voltage and outputs the comparison result. For example, the error amplifier 64 performs the comparison by amplifying a difference between the divided output voltage and the reference voltage, and outputs the comparison result as a control voltage via the signal line Vp. Since the pulse voltage adjusted by this control voltage is generated by the pulse voltage supplying section 30, feedback control is performed in such a manner that the divided output voltage and the reference voltage become substantially equal to each other, and thus the output voltage is stabilized.

[Control for Charge/Discharge]

Figure 5A:
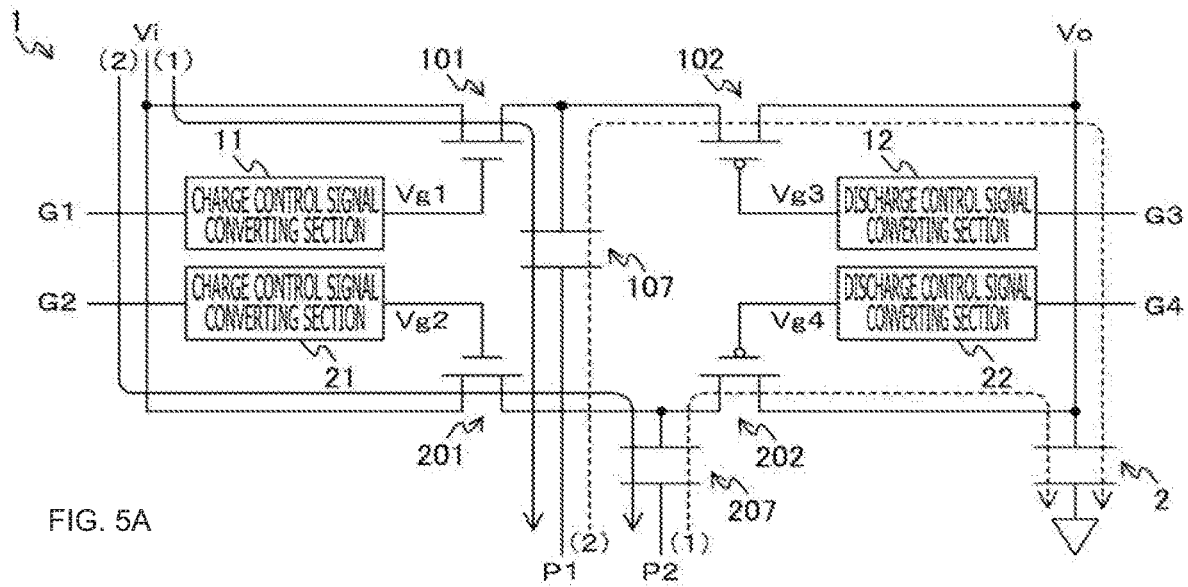
FIGS. 5A and 5B are diagrams depicting an example of charge/discharge control according to the first embodiment of the present technology.
Figure 5B:
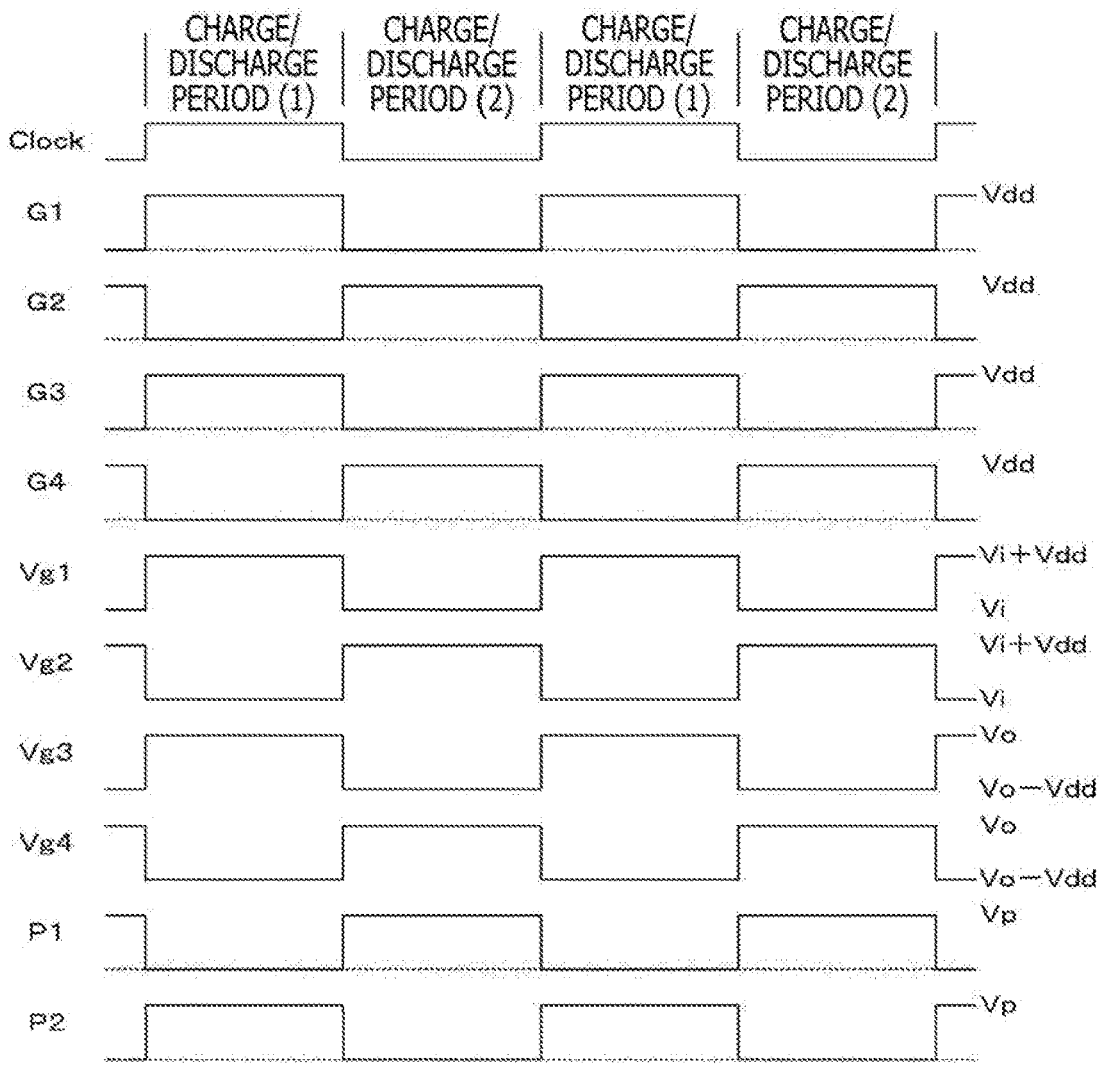

FIGS. 5A and 5B are diagrams depicting an example of charge/discharge control according to the first embodiment of the present technology. The figure is a diagram representing an operation of the charge pump circuit, and FIG. 5A in the figure is a diagram in which the charge pump circuits 10 and 20 illustrated in FIG. 1 are simplified. In addition, a solid line arrow in FIG. 5A represents a current at the time of charge and the dotted line arrow represents a current at the time of discharge. Moreover, (1) and (2) in FIG. 5A represent currents corresponding to charge/discharge periods (1) and (2) in FIG. 5B. FIG. 5B is a chart representing the control signals transmitted through the signal line G1 and the like. In FIG. 5B, Clock represents the clock signal transmitted through the signal line Clock. In addition, G1 and G2 represent the charge control signals transmitted through the signal lines G1 and G2. In addition, G3 and G4 represent the discharge control signals transmitted through the signal lines G3 and G4. Moreover, Vg1 and Vg2 represent the charge control signals converted by the charge control signal converting sections 11 and 21, respectively. Moreover, Vg3 and Vg4 represent the discharge control signals converted by the discharge control signal converting sections 12 and 22, respectively. Moreover, P1 and P2 represent the pulse voltages transmitted through the signal lines P1 and P2. Further, a broken line in FIG. 5B represents a ground potential (0 V).

As represented in the figure, G1 and G3 are in phase with the clock signal, and G2 and G4 are opposite in phase from the clock signal. The amplitude of each of G1 to G4 and Vg1 and Vg2 is substantially equal to that of the power supply voltage Vdd. Vg1 and Vg2 are converted into the signals based on the input power supply voltage Vi, and Vg3 and Vg4 are converted into the signals based on the output voltage Vo.

In the charge/discharge period (1) in FIG. 5B, the charge current is caused to flow through the MOS transistor 101 and the capacitor 107. At the same time, the discharge current is caused to flow through the MOS transistor 202 and the capacitor 207. At this time, a pulse voltage is supplied to the capacitor 207.

In the charge/discharge period (2) in FIG. 5B, the charge current is caused to flow through the MOS transistor 201 and the capacitor 207. At the same time, the discharge current is caused to flow through the MOS transistor 102 and the capacitor 107. At this time, a pulse voltage is supplied to the capacitor 107.

As just described, charge and discharge are alternately performed in the charge pump circuits 10 and 20. As a result, since power feeding to the capacitor 2 is continuously performed, ripple of the output voltage can be decreased, and generation of the electromagnetic interference can be reduced. In addition, by using complementary semiconductor elements as the MOS transistors 101 and 102, respectively, and individually applying the control voltage to be applied to the gates, the power supply circuit 1 can be operated irrespective of the difference between the input power supply voltage and the output voltage. Thus, even in a case in which the voltage of the difference between the input power supply voltage and the output voltage is low, the power supply circuit can be operated stably.

[Modification]

Although in the embodiment described above the two change pump circuits 10 and 20 are used, the power supply apparatus may be constituted by one charge pump circuit.

Figure 6:
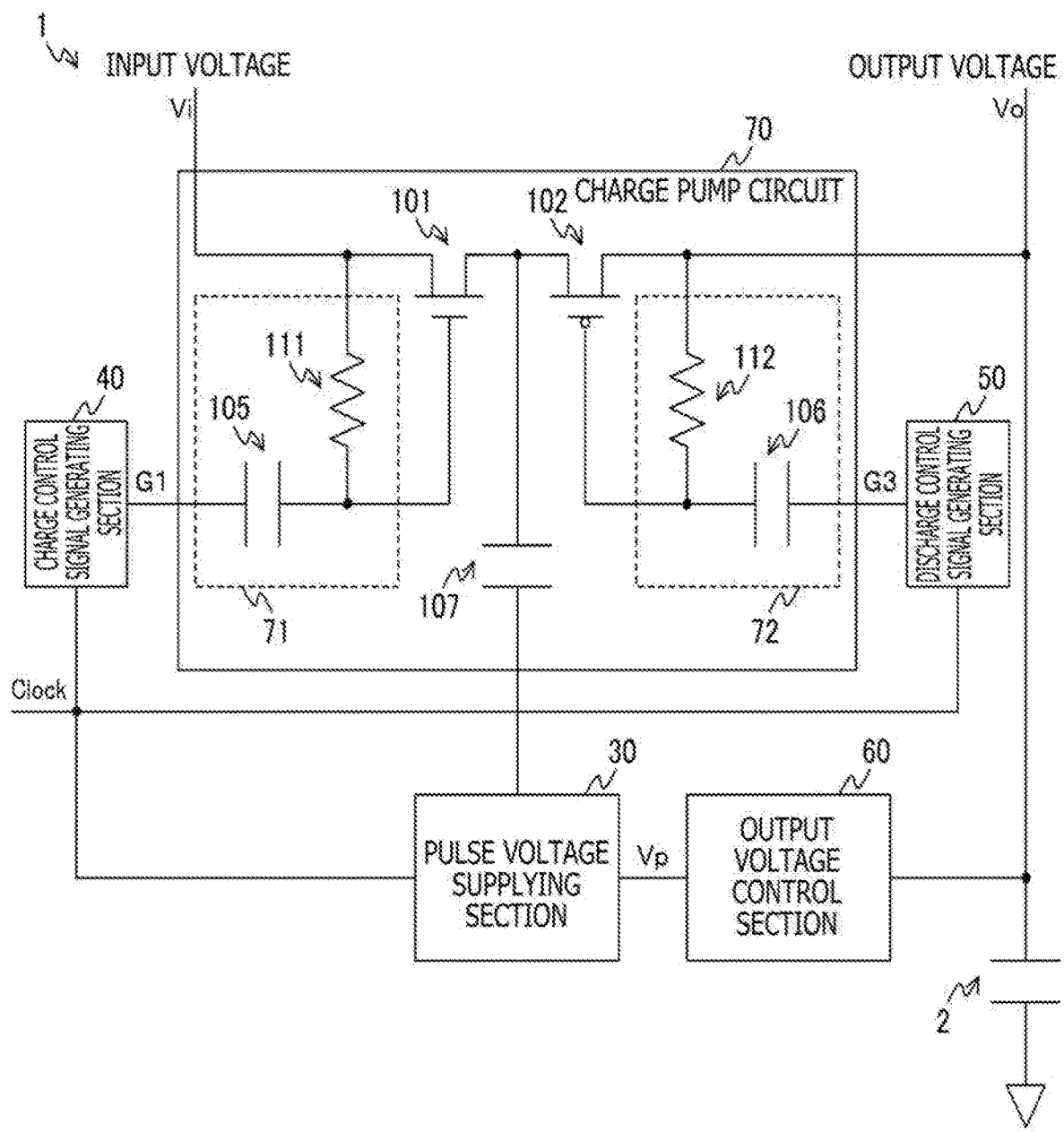
FIG. 6 is a diagram depicting an example of a configuration of a power supply apparatus according to a modification of the first embodiment of the present technology.

FIG. 6 is a diagram depicting an example of a configuration of a power supply apparatus according to a modification of the first embodiment of the present technology. The power supply apparatus 1 depicted in the figure is different from the power supply apparatus 1 described in FIG. 1 in that the power supply apparatus 1 of the figure includes a charge pump circuit 70 in place of the charge pump circuits 10 and 20.

The charge pump circuit 70 includes a charge control signal converting section 71 and a discharge control signal converting section 72 in place of the charge control signal converting section 11 and the discharge control signal converting section 12. In the charge control signal converting section 71, a resistor 111 is arranged in place of the MOS transistor 103 in the charge control signal converting section 11. In addition, in the discharge control signal converting section 72, a resistor 112 is arranged in place of the MOS transistor 104 in the discharge control signal converting section 12. As just described, the configuration of the power supply apparatus 1 can be simplified.

2. Second Embodiment

In the power supply apparatus 1 of the first embodiment described above, the charge/discharge periods (1) and (2) are provided continuously. In contrast, the power supply apparatus 1 according to a second embodiment of the present technology is different from that in the first embodiment in that a pause period is provided between the charge/discharge periods (1) and (2).

[Control for Charge/Discharge]

Figure 7:
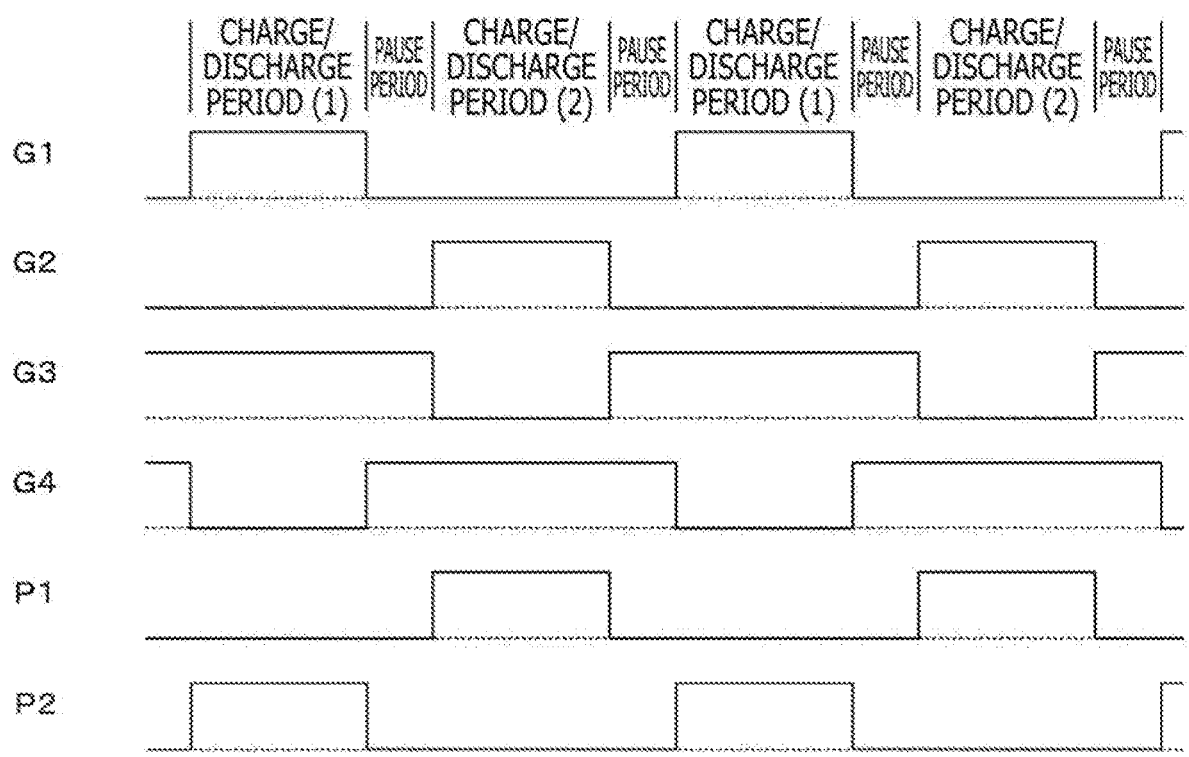
FIG. 7 is a chart depicting an example of charge/discharge control according to a second embodiment of the present technology.

FIG. 7 is a chart depicting an example of the charge/discharge control according to the second embodiment of the present technology. The figure is a chart representing a charge control signal, a discharge control signal, and a pulse voltage that are generated respectively by the charge control signal generating section 40, the discharge control signal generating section 50, and the pulse voltage supplying section 30. As represented in the figure, a pause period is provided between each adjacent two charge/discharge periods (1) and (2). This pause period is a period during which a control signal is not outputted, and is also a period during which each of the MOS transistors 101, 102, 201 and 202 described in FIG. 1 becomes non-conductive. In addition, during the pause period, supply of pulse voltage is also suspended. As a result, back flow of the output voltage can be prevented.

Since the configuration of the power supply apparatus 1 other than the above configuration is similar to that of the power supply apparatus 1 according to the first embodiment of the present technology, description is omitted.

As just described, according to the second embodiment of the present technology, by providing a pause period between the charge and the discharge, back flow of the output voltage can be prevented, and reduction in efficiency and generation of noise can be prevented.

3. Third Embodiment

The power supply apparatus 1 according to the first embodiment described above generates an output voltage having the same polarity as that of the input power supply voltage. In contrast, a power supply apparatus 1 according to a third embodiment of the present technology is different from that in the first embodiment of the present technology in that the power supply apparatus 1 according to the third embodiment generates an input voltage having a polarity different from that of the output power supply voltage.

[Control for Charge/Discharge]

Figure 8A:
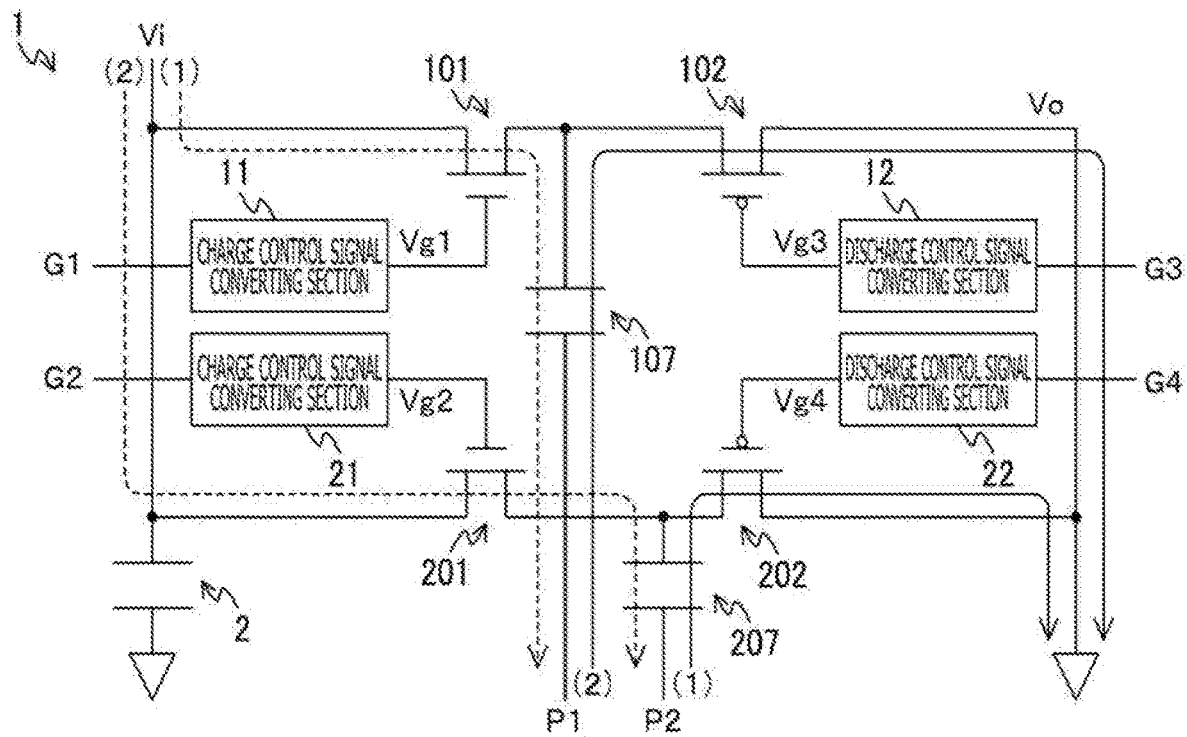
FIGS. 8A and 8B are diagrams depicting an example of charge/discharge control according to a third embodiment of the present technology.
Figure 8B:
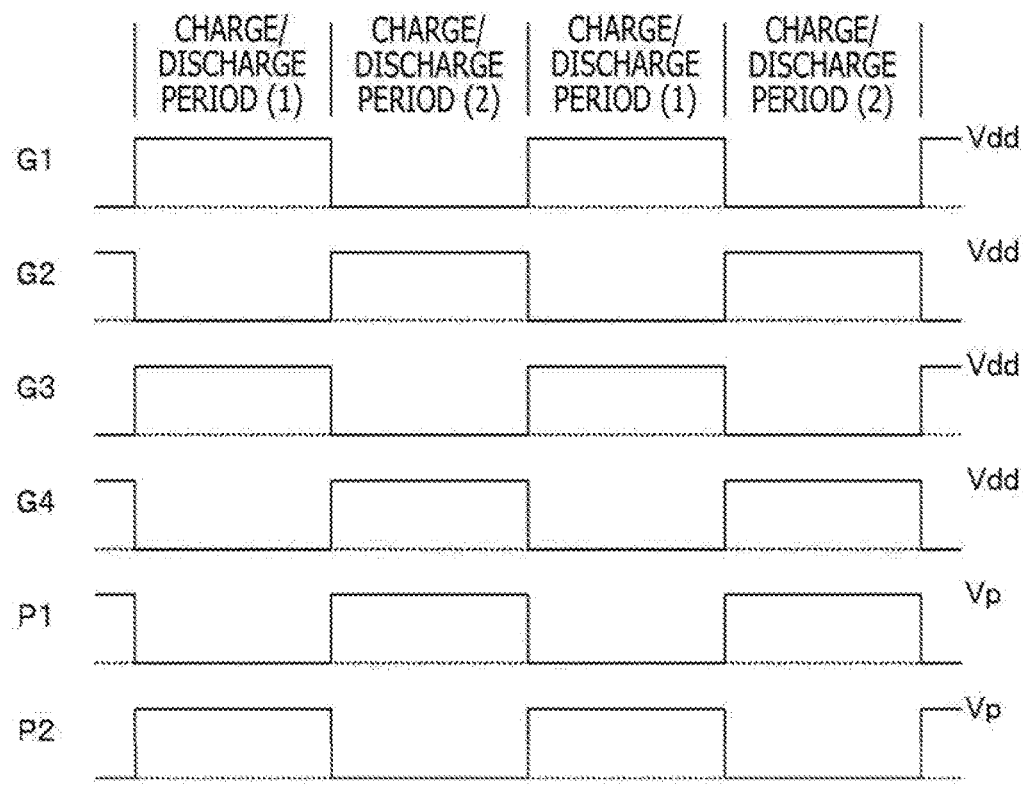

FIGS. 8A and 8B are diagrams depicting an example of charge/discharge control according to the third embodiment of the present technology. FIG. 8A is a diagram in which a configuration of the power supply apparatus 1 according to the third embodiment of the present technology is simplified for representation. In addition, FIG. 8B is a chart representing the charge control signal and the like transmitted through the signal line G1 and the like. The power supply apparatus 1 in FIG. 8A is different from the power supply apparatus 1 described in FIGS. 5A and 5B in that the wiring Vo is grounded, and the output voltage is supplied to the wiring Vi.

As represented in FIG. 8B, in the charge/discharge period (1), the charge current is caused to flow through the MOS transistor 202 and the capacitor 207. At this time, the pulse voltage is supplied to the capacitor 207. At the same time, the discharge current is caused to flow through the MOS transistor 101 and the capacitor 107. Subsequently, in the charge/discharge period (2), the charge current is caused to flow through the MOS transistor 102 and the capacitor 107. At this time, the pulse voltage is supplied to the capacitor 107. At the same time, the discharge current is caused to flow through the MOS transistor 201 and the capacitor 207. These discharge currents are caused to flow in a direction opposite to that of the discharge current in FIGS. 5A and 5B, and an output voltage having a negative polarity is supplied. As just described, a charge pump current having the same circuit configuration can be used as the positive polarity power supply circuit and the negative polarity power supply circuit. Accordingly, change of the output voltage of the power supply apparatus 1 can be easily performed.

Since the configuration of the power supply apparatus 1 other than the above configuration is similar to that of the power supply apparatus 1 according to the first embodiment of the present technology, description is omitted.

As described above, according to the third embodiment of the present technology, the positive polarity power supply circuit and the negative polarity power supply circuit can be configured by a charge pump circuit having the same circuit configuration.

4. Fourth Embodiment

The power supply apparatus 1 according to the first embodiment described above uses the two charge pump circuits 10 and 20. In contrast, a power supply apparatus 1 according to a fourth embodiment of the present technology is different from that in the first embodiment in that the power supply apparatus 1 according to the fourth embodiment uses four charge pump circuits.

[Configuration of Power Supply Apparatus]

Figure 9:
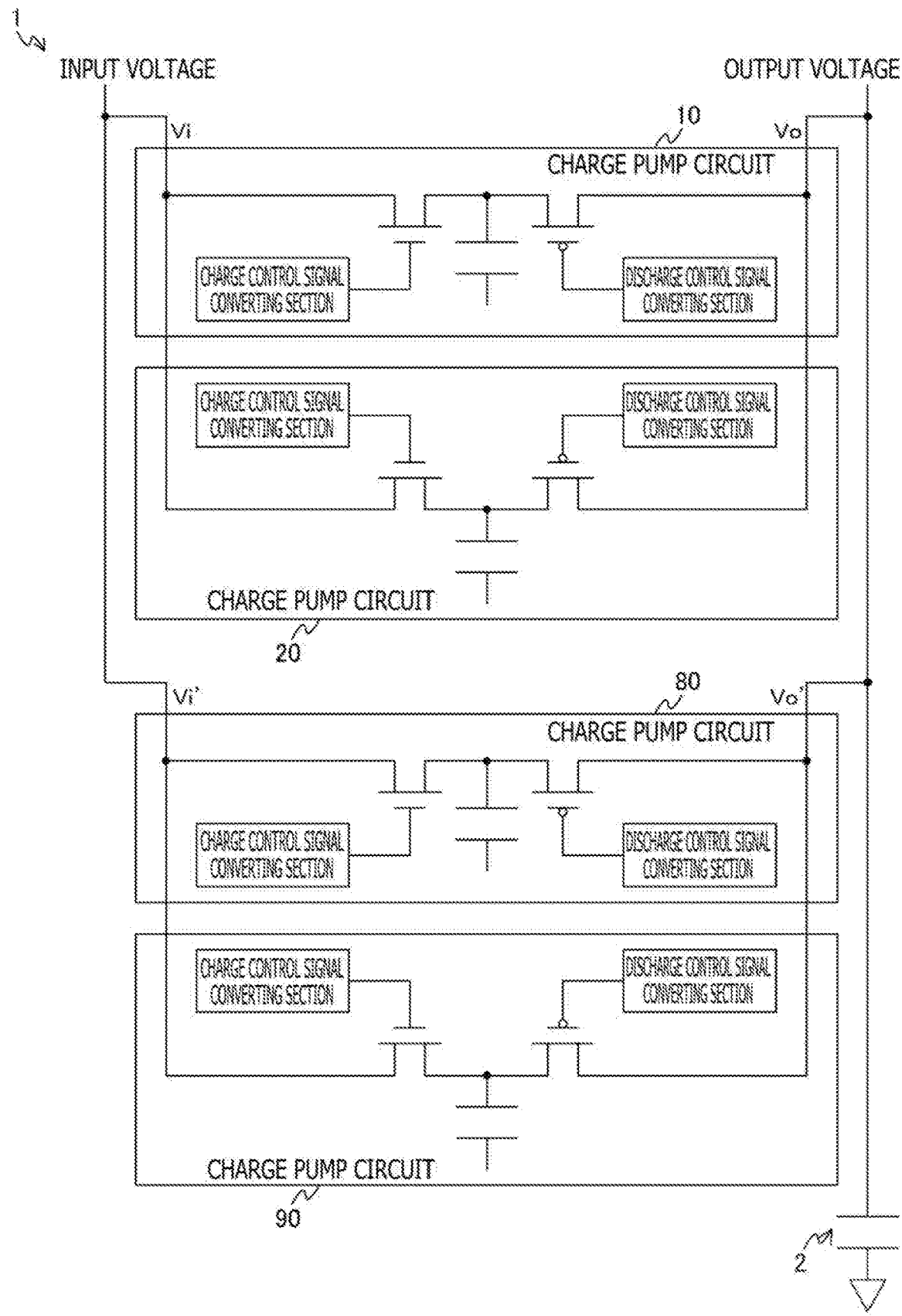
FIG. 9 is a diagram depicting an example of a configuration of a power supply apparatus according to a fourth embodiment of the present technology.

FIG. 9 is a diagram depicting an example of a configuration of a power supply apparatus according to the fourth embodiment of the present technology. The figure is a diagram in which a charge pump circuit portion of the power supply apparatus 1 is simplified for representation. The power supply apparatus 1 in the figure is different from the power supply apparatus 1 described in FIG. 1 in that the power supply apparatus 1 further includes charge pump circuits 80 and 90.

In the power supply apparatus 1 in the figure, the charge pump circuits 10, 20, 80, and 90 are connected in parallel to one another and an output voltage is supplied to the signal line Vo. As a result, an output current capacity of the power supply apparatus 1 can be increased. In other words, the power supply apparatus 1 in the figure can supply an output current which is twice as large as that of the power supply apparatus 1 in FIG. 1. As just described, in the case where N charge pump circuits are connected in parallel to one another, N-fold output current can be supplied.

[Another Configuration of Power Supply Apparatus]

Figure 10:
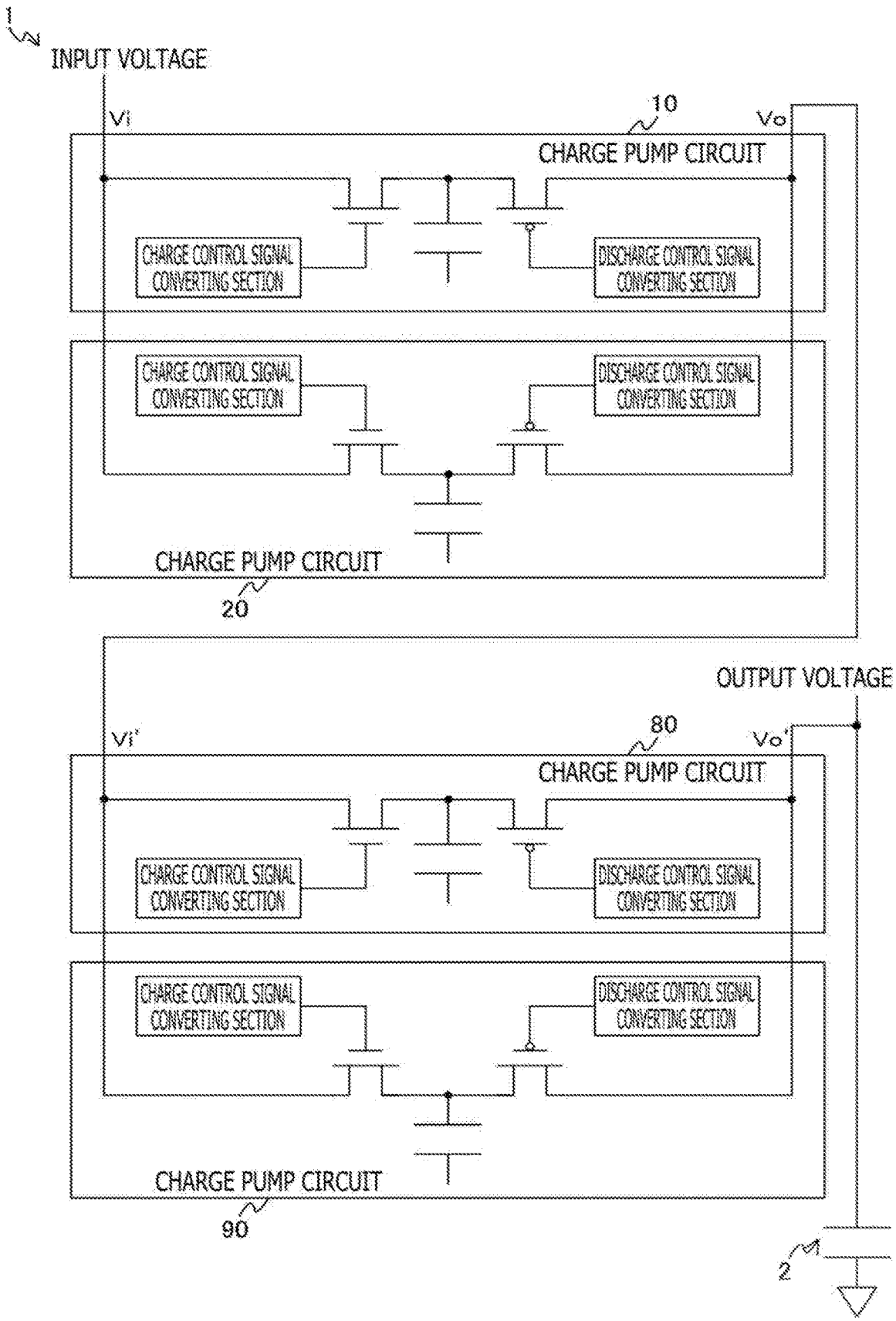

FIG. 10 is a diagram depicting an example of another configuration of the power supply apparatus according to the fourth embodiment of the present technology. The power supply apparatus 1 in the figure adopts a configuration in which the charge pump circuits 80 and 90 are cascade-connected to the output of the charge pump circuits 10 and 20. In other words, two charge pump circuit portions described in FIG. 1 are cascade-connected to each other to obtain a two-stage configuration. The power supply apparatus 1 in the figure can generate an output voltage which is twice as large as that of the power supply apparatus 1 in FIG. 1. As just described, in the case where charge pump circuits are cascade-connected to each other by N stages, N-fold output voltage can be generated.

As described above, by using a plurality of charge pump circuits and changing the connection thereof, the output voltage and current can be easily changed.

Since the configuration of the power supply apparatus 1 other than the above configuration is similar to that of the power supply apparatus 1 according to the first embodiment of the present technology, description is omitted.

As just described, according to the fourth embodiment of the present technology, by combining charge pump circuits having the same circuit configuration, power supply apparatuses with different voltages and currents can be easily configured.

Lastly, the descriptions of the embodiments described above are examples of the present technology, and the present technology is not limited to the embodiments described above. Accordingly, needless to say, even in the case of embodiments other than the embodiments described above, various changes can be made according to the design and the like as long as these changes do not depart from the technical idea pertaining to the present technology.

It is to be noted that the present technology can also adopt the following configurations.

(1) A power supply circuit including:

a charge pump circuit including a capacitor having first and second terminals and charged with an input voltage, a charge switch connected to the first terminal and charging the capacitor with the input voltage on the basis of a control signal inputted to a control terminal, a discharge switch connected to the first terminal and generating an output voltage by discharging on the basis of a control signal inputted to a control terminal a voltage charged to the capacitor, the discharge switch being complementary with the charge switch, a charge control signal converting section converting a charge control signal that controls the charge into a control signal referenced to the input voltage and inputting the resulting control signal to the control terminal of the charge switch, and a discharge control signal converting section converting a discharge control signal that controls the discharge into a control signal referenced to the output voltage and inputting the resulting control signal to the control terminal of the discharge switch;

a pulse voltage supplying section supplying a pulse voltage to the second terminal; and a control signal generating section exclusively generating the charge control signal and the discharge control signal and supplying the charge control signal and the discharge control signal to the charge control signal converting section and the discharge control signal converting section, respectively.

(2) The power supply circuit according to (1) above, in which
the pulse voltage supplying section supplies the pulse voltage during the discharge.

(3) The power supply circuit according to (1) above, in which
the pulse voltage supplying section supplies the pulse voltage during the charge, and
the charge switch performs the charge with the supplied pulse voltage as the input voltage.

(4) The power supply circuit according to any one of (1) to (3) above, in which
the power supply circuit includes the two charge pump circuits,
the pulse voltage supplying section alternately supplies the pulse voltage to the plurality of charge pump circuits, and
the control signal generating section alternately supplies the charge control signal and the discharge control signal to the two charge pump circuits to cause the two charge pump circuits to exclusively perform the charge and the discharge.

(5) The power supply circuit according to any one of (1) to (4) above, in which
the control signal generating section provides a pause period between the charge control signal and the discharge control signal.

(6) A power supply apparatus including: a charge pump circuit including a capacitor having first and second terminals and charged with an input voltage, a charge switch connected to the first terminal and charging the capacitor with the input voltage on the basis of a control signal inputted to a control terminal, a discharge switch connected to the first terminal and generating an output value by discharging on the basis of a control signal inputted to a control terminal a voltage charged to the capacitor, the discharge switch being complementary with the charge switch, a charge control signal converting section converting a charge control signal that controls the charge into a control signal referenced to the input voltage and inputting the resulting control signal to the control terminal of the charge switch, and a discharge control signal converting section converting a discharge control signal that controls the discharge into a control signal referenced to the output voltage and inputting the resulting control signal to the control terminal of the discharge switch;

a pulse voltage supplying section supplying a pulse voltage to the second terminal;

a control signal generating section exclusively generating the charge control signal and the discharge control signal and supplying the charge control signal and the discharge control signal to the charge control signal converting section and the discharge control signal converting section, respectively; and an output voltage control section adjusting the pulse voltage in response to the output voltage to stabilize the output voltage.

REFERENCE SIGNS LIST

1 . . . Power supply apparatus
2, 105, 106, 107, 205, 206, 207 . . . Capacitor
10, 20, 70, 80, 90 . . . Charge pump circuit
11, 21, 71 . . . Charge control signal converting section
12, 22, 72 . . . Discharge control signal converting section
30 . . . Pulse voltage supplying section
40 . . . Charge control signal generating section
50 . . . Discharge control signal generating section
60 . . . Output voltage control section
31 to 33, 41 to 43, 101 to 104, 201 to 204 . . . MOS transistor
61, 62, 111, 112 . . . Resistor

The invention claimed is:

1. A power supply circuit, comprising:
a first charge pump circuit including:
a capacitor that includes a first terminal and a second terminal,
wherein the capacitor is configured to be charged with an input voltage,
a charge switch including a first type of transistor, wherein
the first type of transistor includes a first control terminal,
the first type of transistor is connected to the first terminal of the capacitor, and
the charge switch is configured to charge the capacitor with the input voltage based on a basis of a first control signal inputted to the first control terminal of the first type of transistor,
a discharge switch including a second type of transistor different from the first type of transistor, wherein
the second type of transistor includes a second control terminal,
the second type of transistor is connected to the first terminal of the capacitor,
the discharge switch is configured to generate an output voltage by discharge of the capacitor,
the discharge of the capacitor is based on a second control signal inputted to the second control terminal of the second type of transistor, and
the discharge switch is complementary with the charge switch,
a charge control signal converting section configured to:
convert a charge control signal into the first control signal referenced to the input voltage,
wherein the charge control signal controls the charge of the capacitor, and
input the first control signal to the first control terminal of the first type of transistor, and
a discharge control signal converting section configured to:
convert a discharge control signal into the second control signal referenced to the output voltage, wherein the discharge control signal controls the discharge of the capacitor, and input the second control signal to the second control terminal of the second type of transistor;

a pulse voltage supplying section configured to supply a pulse voltage to the second terminal of the capacitor; and a control signal generating section configured to:

exclusively generate the charge control signal and the discharge control signal, and supply the generated charge control signal and the generated discharge control signal to the charge control signal converting section and the discharge control signal converting section, respectively.

2. The power supply circuit according to claim 1, wherein the pulse voltage supplying section is further configured to supply the pulse voltage during the discharge of the capacitor.

3. The power supply circuit according to claim 1, wherein the pulse voltage supplying section is further configured to supply the pulse voltage during the charge of the capacitor, and the charge switch is further configured to charge the capacitor with the supplied pulse voltage as the input voltage.

4. The power supply circuit according to claim 1, further comprising a second charge pump circuit, wherein the pulse voltage supplying section is further configured to alternately supply the pulse voltage to the first charge pump circuit and the second charge pump circuit, and the control signal generating section is further configured to alternately supply the charge control signal and the discharge control signal to the first charge pump circuit and the second charge pump circuit, to cause the first charge pump circuit and the second charge pump circuit to exclusively perform the charge and the discharge.

5. The power supply circuit according to claim 1, wherein the control signal generating section is further configured to provide a pause period between the charge control signal and the discharge control signal.

6. A power supply apparatus, comprising:

a charge pump circuit including:

a capacitor that includes a first terminal and a second terminal, wherein the capacitor is configured to be charged with an input voltage, a charge switch connected to the first terminal of the capacitor, wherein the charge switch is configured to charge the capacitor with the input voltage based on a first control signal inputted to a control terminal of the charge switch, a discharge switch connected to the first terminal of the capacitor, wherein the discharge switch is configured to generate an output voltage by discharge of a voltage charged to the capacitor, the discharge of the voltage charged to the capacitor is based on a second control signal inputted to a control terminal of the discharge switch, and the discharge switch is complementary with the charge switch, a charge control signal converting section configured to:

convert a charge control signal into the first control signal referenced to the input voltage, wherein the charge control signal controls the charge of the capacitor, and input the first control signal to the control terminal of the charge switch, and a discharge control signal converting section configured to:

convert a discharge control signal into the second control signal referenced to the output voltage, wherein the discharge control signal controls the discharge, and input the second control signal to the control terminal of the discharge switch;

a pulse voltage supplying section configured to supply a pulse voltage to the second terminal of the capacitor;

a control signal generating section configured to:

exclusively generate the charge control signal and the discharge control signal, and supply the generated charge control signal and the generated discharge control signal to the charge control signal converting section and the discharge control signal converting section, respectively; and an output voltage control section configured to adjust the pulse voltage in response to the output voltage to stabilize the output voltage.

7. A power supply apparatus, comprising:

a charge pump circuit including:

a capacitor that includes a first terminal and a second terminal, wherein the capacitor is configured to be charged with an input voltage, a charge switch connected to the first terminal of the capacitor, wherein the charge switch is configured to charge the capacitor with the input voltage based on a first control signal inputted to a control terminal of the charge switch, a discharge switch connected to the first terminal of the capacitor, wherein the discharge switch is configured to generate an output voltage by discharge of the capacitor, the discharge of the capacitor is based on a second control signal inputted to a control terminal of the discharge switch, and the discharge switch is complementary with the charge switch, a charge control signal converting section configured to:

convert a charge control signal into the first control signal referenced to the input voltage, wherein the charge control signal controls the charge of the capacitor, and input the first control signal to the control terminal of the charge switch, and a discharge control signal converting section configured to:

convert a discharge control signal into the second control signal referenced to the output voltage, wherein the discharge control signal controls the discharge of the capacitor, and input the second control signal to the control terminal of the discharge switch;

a pulse voltage supplying section configured to supply a pulse voltage to the second terminal of the capacitor during the charge of the capacitor, wherein the charge switch is further configured to charge the capacitor with the supplied pulse voltage as the input voltage; and a control signal generating section configured to:

exclusively generate the charge control signal and the discharge control signal, and supply the generated charge control signal and the generated discharge control signal to the charge control signal converting section and the discharge control signal converting section, respectively.

* * * * *